United States Patent [19]
Rogols et al.

[11] Patent Number: 6,022,569
[45] Date of Patent: Feb. 8, 2000

[54] PROCESS FOR PREPARING A STARCH COATED POTATO PRODUCT AND PRODUCT THEREOF

[75] Inventors: Saul Rogols, Golden; John Harold Woerman, Highlands Ranch; Wallace H. Kunerth, Kildeer, all of Colo.

[73] Assignee: Penford Corporation, Bellevue, Wash.

[21] Appl. No.: 08/912,086

[22] Filed: Aug. 15, 1997

[51] Int. Cl.[7] .................................................. A23L 1/216
[52] U.S. Cl. ......................... 426/102; 426/302; 426/637
[58] Field of Search .................................. 426/102, 637, 426/302

[56] References Cited

U.S. PATENT DOCUMENTS

| | | | |
|---|---|---|---|
| Re. 27,531 | 12/1972 | Murray et al. | |
| 3,424,591 | 1/1969 | Gold | 426/441 |
| 3,597,227 | 8/1971 | Murray et al. | |
| 3,751,268 | 8/1973 | Van Patten et al. | |
| 4,272,553 | 6/1981 | Bengtsson et al. | 426/241 |
| 4,317,842 | 3/1982 | El-Hag | 426/302 |
| 4,418,090 | 11/1983 | Bohrmann et al. | 426/578 |
| 4,447,459 | 5/1984 | Balboni et al. | 426/441 |
| 4,504,509 | 3/1985 | Bell et al. | 426/548 |
| 4,529,607 | 7/1985 | Lenchin et al. | 426/94 |
| 4,542,030 | 9/1985 | Haury et al. | 426/262 |
| 4,551,340 | 11/1985 | El-Hag et al. | 426/438 |
| 4,595,597 | 6/1986 | Lenchin et al. | 426/555 |
| 4,632,848 | 12/1986 | Gosset et al. | 427/154 |
| 4,663,180 | 5/1987 | Padula | 426/637 |
| 4,931,296 | 6/1990 | Shanbhag et al. | 426/243 |
| 4,931,298 | 6/1990 | Shanbhag et al. | 426/296 |
| 4,937,084 | 6/1990 | Julian | 426/144 |
| 5,000,970 | 3/1991 | Shanbhag et al. | 426/296 |
| 5,004,616 | 4/1991 | Shanbhag et al. | 426/102 |
| 5,059,435 | 10/1991 | Sloan et al. | 426/102 |
| 5,084,291 | 1/1992 | Burrows et al. | 426/441 |
| 5,087,467 | 2/1992 | Schwank | 426/262 |
| 5,126,152 | 6/1992 | Feeney et al. | 426/102 |
| 5,141,759 | 8/1992 | Sloan et al. | 426/102 |
| 5,188,859 | 2/1993 | Lodge et al. | 426/637 X |
| 5,217,736 | 6/1993 | Feeney et al. | 426/102 |
| 5,242,699 | 9/1993 | Bednar et al. | 426/302 |
| 5,279,840 | 1/1994 | Baisier et al. | 426/102 |
| 5,281,432 | 1/1994 | Zallie et al. | 426/549 |
| 5,302,410 | 4/1994 | Calder et al. | 426/637 |
| 5,328,704 | 7/1994 | Ritch | 426/102 |
| 5,393,552 | 2/1995 | Brusacker et al. | 426/637 |
| 5,431,944 | 7/1995 | Malvej | 426/552 |
| 5,464,642 | 11/1995 | Villagran et al. | 426/439 |
| 5,486,369 | 1/1996 | Mason | 426/321 |
| 5,622,741 | 4/1997 | Stubbs et al. | 426/243 |
| 5,648,110 | 7/1997 | Wu et al. | 426/102 |
| 5,897,898 | 4/1999 | Rogols et al. | 426/102 |

FOREIGN PATENT DOCUMENTS

WO 85/01188  3/1985  WIPO.

OTHER PUBLICATIONS

Srivastava, H.C. and Patel, M.M., "Viscosity Stabilization of Tapioca Starch," *Starke*, 25(1):17–21 (1973).

*Primary Examiner*—Arthur L. Corbin
*Attorney, Agent, or Firm*—Marshall, O'Toole, Gerstein, Murray & Borun

[57] ABSTRACT

The present invention provides an aqueous starch enrobing slurry for coating the outer surface of a potato product having an as is solids content comprising ungelatinized starch and not less than 50% by weight rice flour, the method of preparing the potato product and the coated potato product produced thereby.

9 Claims, No Drawings

PROCESS FOR PREPARING A STARCH COATED POTATO PRODUCT AND PRODUCT THEREOF

BACKGROUND OF THE INVENTION

The present invention relates generally to coated potato products and formulations for coating potato products such as frozen french fries.

Methods for preparing and applying coatings to the outer surfaces of frozen potato products are well known in the art. Murray et al. U.S. Pat. No. 3,597,227 disclose a process in which raw potato strips are coated in a hot aqueous solution of modified gelatinized amylose derived from corn or potato starch. The process is said to produce a finished product which has superior strength and rigidity. Van Patten et al., U.S. Pat. No. 3,751,268 disclose the coating of blanched potato pieces with an ungelatinized unmodified high amylose starch having an amylose content of at least 50 percent. The coated potato strips are deep fat fried during which the starch in the coating is gelatinized.

El-Hag et al. U.S. Pat. No. 4,317,842 discloses the process of dipping blanched potato strips in an aqueous ungelatinized starch slurry to coat the strips, which are next soaked in hot oil to gelatinize the starch in the coating. The strips are then parfried and frozen. The strips may be reheated for consumption by heating in an oven rather than by deep fat frying.

Lenchin et al., WO 85/01188 disclose batters comprising the flour of high amylose corn hybrids for producing microwaveable pre-fried foodstuffs. The use of flours of high amylose corn hybrids is said to provide pre-fried foodstuffs with improved crispness after microwave cooking which otherwise tends to make such products soggy.

Sloan et al., U.S. Pat. Nos. 5,059,435 and 5,141,759 disclose a process for preparing frozen coated potatoes wherein raw potatoes are washed, cut, blanched and partially dehydrated. The cut potatoes are then coated with an aqueous starch slurry comprising 15 to 35% by weight modified ungelatinized potato starch, 2 to 10% by weight modified ungelatinized corn starch, 2 to 10% by weight rice flour and other optional ingredients. The coated potato strips are parfried in oil and then frozen. The frozen strips are prepared for consumption by either finish frying in hot oil, or heating in an oven. The starch coating is said to enhance the holding quality of the ready to consume product and to improve the acceptability of the finished product by increasing the crispness of the outer surface, and helping to maintain the tenderness of the interior of the cut potato. In particular, the potato starch and corn starch are each said to contribute crispness to the coating, and because they are not gelatinized prior to the parfrying step they decrease clumping of the strips during processing. The rice flour is said to provide a desirable tenderness in the finished product.

The Sloan patents teach the use of potato starches which have been modified through known chemical cross-linking processes in order to minimize sticking or clumping of the strips during processing, and coat the potato strips evenly. The Sloan patents disclose as preferred an ungelatinized chemically modified potato starch (K-1010, Penford Corporation, Richland, WA) which is crosslinked with phosphorus oxychloride ($POCl_3$) at an effective level of 980 ppm. (This starch is characterized by a Brabender Amylograph viscosity of 50–100 BU ("Brabender units") when measured at a 9% starch solids concentration for 15 minutes at 95° C.) A chemically modified ungelatinized cornstarch said to be preferred for use in conjunction with the above modified potato starch is said to be Flojel® (National Starch and Chemical Corp., Bridgewater, N.J.) which is said to contribute crispness to the coating and to produce an optimal result when present in the coating slurry at a concentration of between two and ten percent by weight.

Also of interest to the present application is the disclosure of co-owned U.S. Pat. No. 5,648,110 which discloses use of potato starches with selected crosslinking levels as preferred components of starch enrobing slurries. Specifically, the patent discloses that potato strips coated with an aqueous starch enrobing slurry having an as is solids content comprising not less than about 50% by weight of ungelatinized crosslinked potato starch characterized by a viscosity of from 200 to 1100 Brabender Units (BU) when measured at 9% solids concentration after 15 minutes at 95° C. (which corresponds to a crosslinking level of from 550 to 900 ppm using $POCl_3$) and from 10 to 25% by weight rice flour provide improved crispness and texture properties. Also of potential interest to the present application is co-owned and copending U.S. patent application Ser. No. 08/822,031 filed Mar. 24, 1997, now abandoned which is a continuation-in-part of U.S. Pat. No. 5,648,110 and discloses the use of not less than about 50% by weight of ungelatinized crosslinked potato starch characterized by a viscosity of from 200 to 1100 Brabender Units and up to 45% by weight rice flour provided improved crispness properties. Also of potential interest to the present application is co-owned U.S. Pat. No. 5,750,168 the disclosure of which is hereby incorporated by reference which is directed to starch enrobing slurries having a solids content comprising not less than 20% by weight ungelatinized crosslinked tapioca starch characterized by a crosslinking level of from 300 to 1000 ppm. The patent teaches the incorporation of rice flour as a component of the enrobing slurries at solids contents preferably ranging from 10% to 25%.

Despite the many advances in the french fry coating art there nevertheless remains a need for improved enrobing slurries characterized by improved crispness, holding and flavor properties.

SUMMARY OF THE INVENTION

The present invention provides improved aqueous starch enrobing slurries which provide improved flavor, crispness and other physical properties to coated potato products such as french fries. As one aspect of the present invention, starch enrobing slurries have been found that provide various improved properties to the resulting french fries which they are used to encoat. Specifically it has been found that unexpected crispness can be obtained in a french fry coating composition by utilizing an aqueous starch enrobing slurry having an as is solids content comprising ungelatinized starch and not less than 50% or more preferably 60% or 70% rice flour. It has been found that the use of such slurries comprising elevated levels of rice flour in combination with ungelatinized starches provides surprisingly improved properties to the coated french fries. The ungelatinized starch may be selected from any of the wide variety of starches known to the art including modified, unmodified and derivative starches including potato starch, corn starch, tapioca starch, wheat starch. According to one aspect of the invention tapioca starch is particularly preferred for use as the ungelatinized starch. According to another aspect of the invention, unmodified or slightly modified potato starch having a crosslinking level of less than 400 ppm based on crosslinking with $POCl_3$ is particularly preferred as the ungelatinized starch.

The ungelatinized starches useful for practice with the invention may be crosslinked but need not be. While the starches can be crosslinked according to any of a variety of methods known to the art, starches crosslinked with an agent selected from the group consisting of phosphorus oxychloride, sodium trimetaphosphate/tetrametaphosphate, adipic anhydride and epichlorohydrin are particularly preferred. Contrary to the teachings of the prior art, enrobing slurries incorporating modified potato starches having greater than about 400 ppm crosslinking based on crosslinking with $POCl_3$ generally require an additional crisping agent such as a dextrin or the like. Surprisingly, enrobing slurries incorporating ungelatinized potato starches which are unmodified or are modified but have a crosslinking level of less than 400 ppm do not generally require use of additional crisping agents. Thus, the invention further provides an aqueous starch enrobing slurry for coating the outer surface of a potato product having an as is solids content comprising: ungelatinized, modified or unmodified potato starch having a crosslinking level of less than 400 ppm starch and not less than 35% rice flour.

The invention further provides processes for preparing a frozen potato product with a film-like coating on the outer surface and the products so produced, which comprises: cutting the raw potatoes; blanching the potatoes; partially drying, the potatoes; coating the potatoes with the aqueous starch slurries of the invention; followed by parfrying the potatoes in hot oil; and freezing the potatoes.

The invention further provides a dry batter mix for coating the outer surface of a potato product having an as is solids content comprising ungelatinized starch and not less than 50% rice flour and methods of producing such a dry batter mix comprising blending ungelatinized starch and not less than 50% rice flour. For the purposes of this invention "as is solids content" refers to a solids content for a starch assuming a water concentration of about 12% by weight.

DETAILED DESCRIPTION

Processes for the production of frozen french fries are well known and include the basic steps of preparing raw potatoes by washing, peeling and cutting into appropriately shaped pieces. The resulting potato strips are then blanched according to conventional methods in order to inactivate enzymes in the potato and to leach sugars from the surface of the potato strip. According lo one preferred method, the blanched potato strips are treated in a brine solution comprising components such as sodium chloride, dextrose and other ingredients known to the art. After these steps, the potato strips are then subjected to a drying step to reduce the moisture present in the strips.

The strips are then coated with the aqueous starch enrobing slurry of the invention having an as is solids content comprising ungelatinized starch and rice flour. After blending of the solid ingredients with a desired amount of water to produce the french fry batter, the batter may be applied to coat the cut potato strips at a batter pickup of from about 8% to about 30% with a pickup of from 18% to about 22% being preferred and a coating pickup of about 20% being particularly preferred, (based on coated potato strips weight).

After coating with the coating composition, the potato strips are drained and parfried at a temperature of from about 360° F. to about 390° F. for a time period of from 40 seconds to about 90 seconds. Parfrying serves to gelatinize the starch of the potato strips and of the coating and removes moisture from the inside of the potato strip.

The potato strips are then frozen, packaged and preferably stored at a temperature below 0° F. until they are prepared for final consumption. In order to prepare the potato strips for consumption, they are cooked either by finish frying or by baking in an oven. After such preparation, potato strips prepared according to the invention are characterized by a crisp outer layer, a moist tender interior and improved flavor qualities.

Minor amounts of modified pregelled potato starches may be used in the compositions of the invention to provide viscosity control and suspension of the solids in the batter. Specifically, preferred aqueous slurries may have an as is solids content of up to about 5% by weight of an unmodified pregelled potato starch for viscosity control. One preferred modified pregelled potato starch for such use is available commercially as PenPlus® 40 (213 ppm crosslinked) (Penwest Foods Co., Englewood, Colo.) which can be incorporated into the batter composition at preferred solids concentrations of 1% to 5% by weight.

The modified starches used in practice of the invention may be crosslinked with any of a variety of agents according to methods well known to the art but are preferably crosslinked with phosphorus oxychloride under alkaline conditions. Sodium trimetaphosphate is useful for crosslinking but reacts more slowly than does phosphorus oxychloride and accordingly substantially more reagent is required to achieve the same level of crosslinking as would be achieved with phosphorus oxychloride. Adipic anhydride is also useful as a crosslinking agent but reacts even more slowly than does sodium trimetaphosphate. Less preferably, epichlorohydrin may also be used at equivalent levels of crosslinking.

Different starches having different levels of crosslinking, and thus exhibiting different viscosities, may be used together in practice of the invention. For example, one modified starch having a crosslinking level of 400 ppm and characterized by a relatively high viscosity may be used in conjunction with another modified starch having a crosslinking level of 1000 ppm and characterized by a relatively low viscosity to yield a blend of modified starches characterized by a crosslinking level and having a viscosity intermediate between those of the two components. It is noted that United States Food and Drug Administration regulations prohibit the use in food products of starches having greater than 1000 ppm $POCl_3$ crosslinking (based on dry weight of starch solids.) Thus, other starches which are crosslinked at concentrations too high or too low and thus are characterized by viscosities inappropriate for use alone in practice of the invention can be used in conjunction with other starches provided that the overall starch component is characterized by a viscosity within the desired range.

The method for determining the viscosity of ungelatinized starches for use according to the invention utilizes a Brabender Amylograph viscometer according to conventional methods known to the art as set out below. Specifically, 45.0 grams of "dry basis" starch (to yield 13.5% solids) is placed in a beaker to which distilled water is added to make up 450 grams and is mixed thoroughly with a magnetic stirring bar. The pH of the mixture is adjusted to 7.0 with dilute (approximately 0.5%) NaOH or dilute (approx. 0.5%) HCl. The pH should be determined over a period of 5 to 10 minutes and should be measured both before and after the viscometer run. The starch slurry is then added to the viscometer bowl and the beaker rinsed with distilled water to give a total starch and water weight of 500 grams. The Brabender Amylograph is then run on program 2 comprising a starting temperature of 25° C., a heating rate of 1.5° C./minute to 95° C., running at 95° C. for 15 minutes wherein the measurement is taken at the conclusion of 15 minutes in Brabender units (BU), and cooling at 1.5° C./minute to 50° C.

Rice flours suitable for use with the invention include long grain, medium grain, short grain or waxy rice with long grain rice flour being preferred. Long grain rice provides the best results for crispness, because of its higher amylose content in the starch. Nevertheless, medium grain, short grain and waxy rice flours work well according to the present invention. This is surprisingly the case with waxy rice flour which in applications such as that of U.S. Pat. No. 5,648,110 was said to produce french fries having a hard crunch immediately after frying but which became soft and chewy within ten minutes of frying.

A variety of other flours and starches may optionally be used in producing the coating formulations of the invention including but not limited to potato starch, potato flour, wheat flour, wheat starch, oat flour, oat starch, corn flour and corn starch. Such starches may be crosslinked and/or substituted such as by acetylation or other means.

Optional minor ingredients for use in providing the coating compositions of the invention include maltodextrins, dextrins, microcrystalline cellulose, and hydrocolloids including hydroxypropyl methyl cellulose, and gums including xanthan gum, guar gum and the like which are used to provide improved structure and keeping qualities to the coated french fry products. Maltodextrins are preferably used at solids concentrations of up to 6%. Maltodextrins useful with the invention may be derived from any type of starch including tapioca, potato and corn starch and include those characterized by having a DE in the range from 2 to 7 with maltodextrins having a DE of about 5 being preferred.

Dextrins obtained from a variety of sources may also be used according to the invention. Suitable tapioca dextrins that may be used according to the invention include those commercially available as Crisp Coat® and Crisp Coat UC® (National Starch and Chemical Co.) which comprise tapioca dextrin alone or in combination with high amylose corn starch. Preferred gum blends comprise approximately 10% gum by weight and are preferably incorporated into the compositions of the invention at solids concentrations of less than 0.1% gum by weight.

Leavening agents in the form of baking powders may also be incorporated into the compositions of the invention in order to open up the structure of the coating batters upon cooking and release moisture from the french fry products without blowing off the coating layer. Suitable baking powders include sodium bicarbonate plus one or more leavening acids such as those in the group consisting of sodium aluminum phosphate (SALP), sodium aluminum sulfate (SAS), sodium acid pyrophosphate (SAPP), dicalcium phosphate (DCP), and anhydrous monocalcium phosphate (AMCP). The combination of sodium bicarbonate and SAPP is preferred. Such leavening agents are preferably added at sodium bicarbonate concentrations of about 0.9 parts soda to 1.1 parts SAPP.

Additional ingredients include protein components such as sodium caseinate, nonfat dry milk, soy, whey, dried egg whites. Such proteins interact with the carbohydrates in the coating compositions to increase film strength, provide structure, improve crispness and prolong holding of crispness. Other ingredients include carbohydrate components such as methyl cellulose, hydroxypropyl methyl cellulose, microcrystalline cellulose and the like. Still other optional ingredients may also be incorporated into the coating formulations of the invention including salt, flavorings, seasonings and coloring agents such as whey or dextrose.

The french fry coating composition is prepared by dry blending of the various solid ingredients. Water is then slowly added to the dry ingredients in an amount selected to provide an appropriate viscosity to the coating batter. It has been found that aqueous slurries containing from about 150 parts to about 300 parts by weight water to 100 parts by weight of the solid ingredients are characterized by a preferred viscosity for coating of the potato strips. The ungelatinized starches do not substantially contribute to the viscosity of the solution.

The crispness of the batter coated french fries is determined by several factors including the cook-out of the starch, the moisture balance between the batter coating surface and inside of the fries, the thickness of the coating layer, and the interaction of ingredients in the coating formulation. The coating forms a discontinuous film which lets the moisture from the inside of the fries escape or vent out, but will not absorb significant amounts of moisture into the coating layer. Controlling moisture migration is important to maintaining the crispness of the fries under a heat lamp. The coating should preferably be somewhat brittle, which gives a clean bite with minimum toughness. There is a fine balance between all the ingredients in the batter formula to achieve crispness and keeping quality with the method used to process the potato strips (contributing to the crispness of the french fries. It is further contemplated that the improved properties provided by the solids making up the starch enrobing slurries of the invention may also be provided when the solids ingredients making up the slurries are applied to potato products in a non-slurry form such as by dusting.

Other aspects and advantages of the present invention will be understood upon consideration of the following illustrative and comparative examples.

EXAMPLE 1

According to this example, different levels of three different types of rice flour, long grain, short/medium grain and waxy, were substituted for a crosslinked potato starch (780 ppm crosslinking) in a representative enrobing composition with the results shown in Table 1 below.

Specifically, Russet-Burbank potatoes were peeled, cut into 9/32 inch strips and immersed and blanched in hot water for 4 to 8 minutes at 165–180° F. After blanching, the potato strips were immersed for 30 seconds in an aqueous solution comprising 0.5% SAPP 28 and 1.5% salt which was held at a temperature of 160–170° F. After removal, the strips were drained and then dried in a conventional dryer at 190° F., for a sufficient length of time to effectuate a 12 to 20 percent water loss.

Starch slurries were then prepared comprising the ingredients listed in Table 1 including water. The water is added to the dry ingredients and well mixed using a wire whisk. The potato strips were then dipped in the starch slurries. The potato strips were then drained to remove excess slurry and to achieve a slurry coating pickup about 18–22%, preferably 20%. The strips were then parfried in soy oil for 40 seconds at 385° F. The potato strips were then frozen in a blast freezer for 30 minutes, transferred into plastic bags and kept in a freezer overnight at approximately −30° F. The frozen samples were reconstituted by frying at 360° F. for 2.5 minutes. The resulting french fries were then placed under heat lamps, and evaluated for color, bite, crispness, taste and holding time.

The resulting products were then tested to evaluate their properties including the degree of crispness (1 being the poorest and 6 being the best), and the time period for which they maintained their crispness with the results reported in Table 1. Also presented are scores of roughness (1 being the poorest, i.e., very tough and 6 being the best, i.e. not tough); color with 0 being lighter and higher numbers being darker; and oil content in % by weight. The results show that even in the absence of dextrin as a crisping agent that crispness generally improved as the level of rice flour increased up to 75% by weight. Such results are unexpected in the absence of a dextrin component to promote crispness.

TABLE 1

| INGREDIENTS | 1A % | 1B % | 1C % | 1D % | 1E % | 1F % |
|---|---|---|---|---|---|---|
| Rice Flour | 0 | 15 | 30 | 45 | 60 | 75 |
| Crosslinked Potato Starch (780 ppm) | 82.2 | 67.2 | 52.2 | 37.2 | 22.2 | 7.5 |
| Crosslinked Potato Starch (980 ppm) | 10 | 10 | 10 | 10 | 10 | 10 |
| Crosslinked Potato Starch (250 ppm) | 1.1 | 1.1 | 1.1 | 1.1 | 1.1 | 1.1 |
| Methocel K4M | 0.3 | 0.3 | 0.3 | 0.3 | 0.3 | 0.3 |
| Salt | 5 | 5 | 5 | 5 | 5 | 5 |
| SAPP#28 | 0.8 | 0.8 | 0.8 | 0.8 | 0.8 | 0.8 |
| Soda | 0.6 | 0.6 | 0.6 | 0.6 | 0.6 | 0.6 |
| Total | 100 | 100 | 100 | 100 | 100 | 100 |
| EVALUATIONS | | | | | | |
| Long Grain Rice Flour | | | | | | |
| CRISPINESS | | | | | | |
| 5 min. | 4.5 | 5.5 | 5 | 5 | 4.5 | 4.5 |
| 10 min. | 3.8 | 4.8 | 4.5 | 4.5 | 4 | 3.8 |
| 15 min. | 3.5 | 4 | 4 | 4 | 3.5 | 3 |
| 20 min. | 3 | 3.5 | 3.5 | 3 | 3 | 2.5 |
| ROUGHNESS | 4 | 4 | 4 | 4 | 4 | 4 |
| COLOR | 0 | 0 | 0 | 0.5 | 0.5 | 1 |
| OIL | 7.4 | 7.3 | 7.6 | 8 | 7.7 | 7.7 |
| Short/Medium Grain Rice Flour | | | | | | |
| CRISPINESS | | | | | | |
| 5 mm. | 4 | 4 | 4.5 | 5 | 5 | 5 |
| 10 min.** | 3.5 | 3.5 | 4 | 4.5 | 5 | 5 |
| 15 min. | 3 | 3 | 3.5 | 4 | 4 | 4 |
| 20 min. | 2 | 2 | 3 | 3 | 3.5 | 3.5 |
| ROUGHNESS | 4 | 4 | 4 | 4 | 4 | 4 |
| COLOR | 0 | 0 | 0 | 0 | 0.2 | 0.5 |
| OIL | 6.96 | 7.06 | 7.18 | 7.61 | 7.2 | 7.31 |
| Waxy Rice Flour | | | | | | |
| CRISPINESS | | | | | | |
| 5 min. | 4.5 | 4.5 | 4.5 | 4.5 | 5 | 5 |
| 10 min. | 4 | 4 | 4 | 4 | 5 | 5 |
| 15 min. | 3.5 | 3.5 | 3.5 | 3.5 | 4.5 | 4.5 |
| 20 min. | 3 | 3 | 3 | 3 | 4 | 4 |
| ROUGHNESS | 4 | 4 | 4 | 4 | 4 | 4 |
| COLOR | | | | | | |
| OIL | 7.07 | 6.35 | 6.35 | 7.7 | 7.81 | 7.27 |

**Very soft centers after 10 mm.

EXAMPLE 2

According to this example, the general method of Example 1 was repeated in which different levels of three different types of rice flour, long grain, short/medium grain and waxy, were substituted for crosslinked tapioca starch (650 ppm crosslinking) in a representative enrobing composition. The results reported in Table 2 below show that optimum crispness and other properties were achieved at rice flour levels of 30 to 60% in the absence of a dextrin crispening component with long grain rice flour providing the best results.

TABLE 2

| INGREDIENTS | 2A % | 2B % | 2C % | 2D % | 2E % | 2F % |
|---|---|---|---|---|---|---|
| Rice Flour | 0 | 15 | 30 | 45 | 60 | 75 |
| Crosslinked Tapioca Starch (650 ppm) | 82.2 | 67.2 | 52.2 | 37.2 | 22.2 | 7.5 |
| Crosslinked Potato Starch (980 ppm) | 10 | 10 | 10 | 10 | 10 | 10 |
| Crosslinked Potato Starch (250 ppm) | 1.1 | 1.1 | 1.1 | 1.1 | 1.1 | 1.1 |
| Methocel K4M | 0.3 | 0.3 | 0.3 | 0.3 | 0.3 | 0.3 |
| Salt | 5 | 5 | 5 | 5 | 5 | 5 |
| SAPP#28 | 0.8 | 0.8 | 0.8 | 0.8 | 0.8 | 0.8 |
| Soda | 0.6 | 0.6 | 0.6 | 0.6 | 0.6 | 0.6 |
| Total | 100 | 100 | 100 | 100 | 100 | 100 |
| EVALUATIONS | | | | | | |
| Long Grain Rice Flour | | | | | | |
| CRISPINESS | | | | | | |
| 5 min. | 4.8 | 5 | 5 | 5.5 | 5.5 | 5 |
| 10 min. | 4.5 | 4.5 | 5 | 5.5 | 5.5 | 5 |
| 15 min. | 4 | 4 | 4.5 | 5.5 | 5.5 | 5 |
| 20 min. | 3.5 | 3.5 | 4 | 5.5 | 5.5 | 5 |
| ROUGHNESS | 4 | 4 | 4 | 4 | 4 | 3 |
| COLOR | 0 | 0 | 0.2 | 0.5 | 0.5 | 1 |
| OIL | 5.64 | 6.1 | 7.8 | 7.48 | 8.11 | 8.63 |
| Short/Medium Grain Rice Flour | | | | | | |
| CRISPINESS | | | | | | |
| 5 min. | 4.8 | 4.8 | 5.5 | 5.5 | 5.5 | 5 |
| 10 min. | 4.5 | 4.5 | 5.5 | 5.5 | 5.5 | 5 |
| 15 min. | 4 | 4 | 5.5 | 5.5 | 5.5 | 4.5 |
| 20 min. | 3.5 | 3.5 | 5 | 5 | 5 | 4 |
| ROUGHNESS | 4 | 4 | 4 | 4 | 4 | 4 |
| COLOR | 0.5 | 0.5 | 0.5 | 0.5 | 0.5 | 0.5 |
| OIL | 6.92 | 6.19 | 7.58 | 7.21 | 7.87 | 6.77 |
| Waxy Rice Flour | | | | | | |
| CRISPINESS | | | | | | |
| 5 min. | 5 | 5 | 5.5 | 5.5 | 5.5 | 5 |
| 10 min. | 4.8 | 4.8 | 5.5 | 5.5 | 5.5 | 5 |
| 15 min. | 4 | 4.5 | 5.5 | 5.5 | 5.5 | 4.5 |
| 20 min. | 3.5 | 4 | 5 | 5 | 5 | 4 |
| ROUGHNESS | 4 | 4 | 4 | 4 | 4 | 4 |
| COLOR | 0.5 | 0.5 | 0.5 | 1 | 1.5 | 1.5 |
| OIL | 7.11 | 7.97 | 7.72 | 9.73 | 8.15 | 8.09 |

EXAMPLE 3

According to this example, the general method of Example 1 was repeated in which different levels of three different types of rice flour, long grain, short/medium grain and waxy, were substituted for crosslinked corn starch (650 ppm crosslinking) in a representative enrobing composition. The results shown in Table 3 below show that optimum crispness and other properties were achieved at rice flour levels of 30 to 60% in the absence of a dextrin crispening component with long grain rice flour providing the best results.

TABLE 3

| INGREDIENTS | 3A % | 3B % | 3C % | 3D % | 3E % | 3F % |
|---|---|---|---|---|---|---|
| Rice Flour | 0 | 15 | 30 | 45 | 60 | 75 |
| Crosslinked Corn Starch (650 ppm) | 82.2 | 67.2 | 52.2 | 37.2 | 22.2 | 7.5 |
| Crosslinked Potato Starch (980 ppm) | 10 | 10 | 10 | 10 | 10 | 10 |
| Crosslinked Potato Starch (250 ppm) | 1.1 | 1.1 | 1.1 | 1.1 | 1.1 | 1.1 |

TABLE 3-continued

| INGREDIENTS | 3A % | 3B % | 3C % | 3D % | 3E % | 3F % |
|---|---|---|---|---|---|---|
| Methocel K4M | 0.3 | 0.3 | 0.3 | 0.3 | 0.3 | 0.3 |
| Salt | 5 | 5 | 5 | 5 | 5 | 5 |
| SAPP#28 | 0.8 | 0.8 | 0.8 | 0.8 | 0.8 | 0.8 |
| Soda | 0.6 | 0.6 | 0.6 | 0.6 | 0.6 | 0.6 |
| Total | 100 | 100 | 100 | 100 | 100 | 100 |
| EVALUATIONS | | | | | | |
| Long Grain Rice Flour | | | | | | |
| CRISPINESS | | | | | | |
| 5 min. | 5.5 | 5.5 | 5 | 5.5 | 5.5 | 5.5 |
| 10 min. | 5.2 | 5.2 | 5 | 5.5 | 5.5 | 4.8 |
| 15 min. | 4.5 | 4.5 | 4.5 | 5 | 5 | 4.5 |
| 20 min. | 4 | 4 | 4 | 4.5 | 4.5 | 4 |
| ROUGHNESS | 4 | 4 | 4 | 4 | 4 | 4 |
| COLOR | 0.5 | 0.5 | 0.5 | 0.5 | 0.8 | 0.8 |
| OIL | 6.44 | 6.92 | 6.77 | 7.64 | 7.59 | 7.75 |
| Short/Medium Grain Rice Flour | | | | | | |
| CRISPINESS | | | | | | |
| 5 min. | 5 | 5 | 5 | 5.5 | 5.5 | 5 |
| 10 min. | 4.5 | 4.5 | 4.5 | 5.5 | 5.5 | 4.5 |
| 15 min. | 4 | 4 | 4 | 5 | 5 | 4 |
| 20 min. | 3.5 | 3.5 | 3.5 | 4.5 | 4.5 | 3.5 |
| ROUGHNESS | 4 | 4 | 4 | 4 | 4 | 4 |
| COLOR | 0 | 0 | 0 | 0 | 0.2 | 0.2 |
| OIL | 6.84 | 7.41 | 6.91 | 6.62 | 7.04 | 7.13 |
| Waxy Rice Flour | | | | | | |
| CRISPINESS | | | ** | ** | | |
| 5 min. | 5 | 5.5 | 5.5 | 5.5 | 5.5 | 5 |
| 10 min. | 5 | 5.5 | 5.5 | 5.5 | 5 | 5 |
| 15 min. | 4.5 | 5 | 5.5 | 5.5 | 5 | 4.5 |
| 20 min. | 4 | 5 | 5.5 | 5.5 | 5 | 4 |
| ROUGHNESS | 4 | 4 | 4 | 4 | 4 | 4 |
| COLOR | 0 | 0 | 0 | 0 | 0.2 | 0.5 |
| OIL | 6.82 | 7.8 | 7.55 | 8.78 | 8.59 | 7.61 |

** Note:
Compared to tapioca variations, these two respective variations exhibited a very "light" crunchy texture.

EXAMPLE 4

According to this example, the method of Example 1 was repeated with the results shown in Table 4 below. Those results are generally poorer than those achieved in Example 1.

TABLE 4

| INGREDIENTS | 4A % | 4B % | 4C % | 4D % | 4E % | 4F % |
|---|---|---|---|---|---|---|
| Rice Flour | 0 | 15 | 30 | 45 | 60 | 75 |
| Crosslinked Potato Starch (780 ppm) | 82.2 | 67.2 | 52.2 | 37.2 | 22.2 | 7.5 |
| Crosslinked Potato Starch (980 ppm) | 10 | 10 | 10 | 10 | 10 | 10 |
| Crosslinked Potato Starch (250 ppm) | 1.1 | 1.1 | 1.1 | 1.1 | 1.1 | 1.1 |
| Methocel K4M | 0.3 | 0.3 | 0.3 | 0.3 | 0.3 | 0.3 |
| Salt | 5 | 5 | 5 | 5 | 5 | 5 |
| SAPP#28 | 0.8 | 0.8 | 0.8 | 0.8 | 0.8 | 0.8 |
| Soda | 0.6 | 0.6 | 0.6 | 0.6 | 0.6 | 0.6 |
| Total | 100 | 100 | 100 | 100 | 100 | 100 |

TABLE 4-continued

| INGREDIENTS | 4A % | 4B % | 4C % | 4D % | 4E % | 4F % |
|---|---|---|---|---|---|---|
| EVALUATIONS | | | | | | |
| Long Grain Rice Flour | | | | | | |
| CRISPINESS | | | | | | |
| 5 min. | 4 | 4.5 | 4.5 | 4.5 | 5 | 4.5 |
| 10 min. | 3.5 | 4 | 4.5 | 4.5 | 4.5 | 4 |
| 15 min. | 3 | 3.5 | 4 | 4 | 4 | 3.5 |
| 20 mm. | 2 | 3 | 3 | 3 | 3 | 2 |
| ROUGHNESS | 4 | 4 | 4 | 4 | 4 | 4 |
| COLOR | 0 | 0 | 0 | 0 | 0 | 0 |
| OIL | 6.5 | 6.5 | 5.8 | 5.6 | 7 | 6 |
| Short/Medium Grain Rice Flour | | | | | | |
| CRISPINESS | | | | | | |
| 5 min. | 4 | 5 | 5 | 5 | 5 | 4.5 |
| 10 min. | 3 | 4 | 4.5 | 4.5 | 4 | 3 |
| 15 min. | 2 | 3 | 3.5 | 3.5 | 3.5 | 2 |
| 20 min. | 1 | 2 | 3 | 3 | 2 | 2 |
| ROUGHNESS | | | | | | |
| COLOR | | | | | | |
| OIL | 6.1 | 6.2 | 5.6 | 7.6 | 6.7 | 7.1 |
| Waxy Rice Flour | | | | | | |
| CRISPINESS | | | | | | |
| 5 min. | 4.5 | 5.5 | 5.5 | 5.5 | 5.5 | 5 |
| 10 min. | 3.5 | 4 | 4 | 4 | 4.5 | 4 |
| 15 min. | 3 | 3.5 | 3.5 | 3.5 | 4 | 3 |
| 20 min. | 2 | 2 | 3 | 3 | 3 | 1 |
| ROUGHNESS | | | | | | |
| COLOR | | | | | | |
| OIL | 7.3 | 7.1 | 7.3 | 6.5 | 7.1 | 7.4 |

EXAMPLE 5

According to this example, the general method of Example 1 was repeated with slurries comprising long grain rice flour and varying amounts of tapioca dextrin and either highly crosslinked potato starch (780 ppm) (Table 5); a slightly crosslinked potato starch (245 ppm) (Table 6); or an unmodified potato starch (Table 7). The results shown in Tables 5, 6 and 7 below show the utility provided by using a potato starch having a crosslinking level less than, 400 ppm and in particular using unmodified potato starch with rice flour at solids concentrations above 35%.

TABLE 5

| EVALUATIONS | 5A | 5B | 5C | 5D | 5E | 5F |
|---|---|---|---|---|---|---|
| CRISPINESS | | | | | | |
| 5 min. | 4.5 | 4.5 | 4.5 | 5 | 5 | 5 |
| 10 min. | 4 | 4 | 4 | 4.5 | 4.5 | 4.5 |
| 15 min. | 3.5 | 4 | 4 | 4 | 4.5 | 4.5 |
| 20 min. | 3 | 3 | 3.5 | 3.5 | 4.5 | 4.5 |
| ROUGHNESS | 4 | 4 | 4 | 4 | 4 | 4 |
| COLOR | 0 | 0 | 0 | 0 | 0.5 | 0.5 |
| OIL | 7.4 | 7.1 | 7.3 | 7.7 | 7.1 | 7.4 |

| INGREDIENTS | 5A % | 5B % | 5C % | 5D % | 5E % | 5F % |
|---|---|---|---|---|---|---|
| Rice Flour Long Grain | 0 | 0 | 0 | 45 | 45 | 45 |
| Crosslinked Potato Starch (780 ppm) | 80.2 | 78.2 | 76.2 | 35.2 | 33.2 | 31.2 |
| 0280 Dextrin | 2 | 4 | 6 | 2 | 4 | 6 |
| Crosslinked Potato Starch (980 ppm) | 10 | 10 | 10 | 10 | 10 | 10 |
| Crosslinked Potato Starch (250 ppm) | 1.1 | 1.1 | 1.1 | 1.1 | 1.1 | 1.1 |

TABLE 5-continued

| | | | | | | |
|---|---|---|---|---|---|---|
| Methocel K4M | 0.3 | 0.3 | 0.3 | 0.3 | 0.3 | 0.3 |
| Salt | 5 | 5 | 5 | 5 | 5 | 5 |
| SAPP #28 | 0.8 | 0.8 | 0.8 | 0.8 | 0.8 | 0.8 |
| Soda | 0.6 | 0.6 | 0.6 | 0.6 | 0.6 | 0.6 |
| Total | 100 | 100 | 100 | 100 | 100 | 100 |

TABLE 6

| INGREDIENTS | 6A % | 6B % | 6C % | 6D % | 6E % | 6F % | 6G % | 6H % | 6I % |
|---|---|---|---|---|---|---|---|---|---|
| Rice Flour Long Grain | 0 | 0 | 0 | 45 | 45 | 45 | 45 | 45 | 45 |
| Crosslinked Potato Starch (245 ppm) | 80.2 | 78.2 | 76.2 | 35.2 | 33.2 | 31.2 | 35.2 | 33.2 | 31.2 |
| 0280 Dextrin | 2 | 4 | 6 | 2 | 4 | 6 | 0 | 0 | 0 |
| Tapioca Dextrin (Crisp Coat ® UC) | 0 | 0 | 0 | 0 | 0 | 0 | 2 | 4 | 6 |
| Crosslinked Potato Starch (980 ppm) | 10 | 10 | 10 | 10 | 10 | 10 | 10 | 10 | 10 |
| Crosslinked Potato Starch (250 ppm) | 1.1 | 1.1 | 1.1 | 1.1 | 1.1 | 1.1 | 1.1 | 1.1 | 1.1 |
| Methocel K4M | 0.3 | 0.3 | 0.3 | 0.3 | 0.3 | 0.3 | 0.3 | 0.3 | 0.3 |
| Salt | 5 | 5 | 5 | 5 | 5 | 5 | 5 | 5 | 5 |
| SAPP #28 | 0.8 | 0.8 | 0.8 | 0.8 | 0.8 | 0.8 | 0.8 | 0.8 | 0.8 |
| Soda | 0.6 | 0.6 | 0.6 | 0.6 | 0.6 | 0.6 | 0.6 | 0.6 | 0.6 |
| Total | 100 | 100 | 100 | 100 | 100 | 100 | 100 | 100 | 100 |
| EVALUATIONS | 6A | 6B | 6C | 6D | 6E | 6F | 6G | 6H | 6I |
| CRISPINESS | | | | | | | | | |
| 5 min. | 4 | 4.5 | 4.5 | 5 | 5.5 | 5.5 | 5.5 | 5.5 | 5.5 |
| 10 min. | 3.5 | 3.5 | 4 | 4 | 5 | 5.5 | 5 | 5 | 5.5 |
| 15 min. | 3 | 3 | 3.5 | 3.5 | 4 | 5.5 | 4 | 4 | 5 |
| 20 min. | 2 | 2 | 2.5 | 2.5 | 3 | 5 | 4 | 4 | 5 |
| ROUGHNESS | 4 | 4 | 4 | 4 | 4 | 4 | 4 | 4 | 4 |
| COLOR | 0 | 0 | 0 | 0 | 0.2 | 0.2 | 0.2 | 1 | 1 |
| OIL | 6.2 | 5.8 | 6.2 | 6.8 | 6.8 | 7.1 | 6.6 | 6.8 | 6.9 |

TABLE 7

| INGREDIENTS | 7A % | 7B % | 7C % | 7C % | 7E % | 7F % | 7G % | 7H % | 7I % |
|---|---|---|---|---|---|---|---|---|---|
| Rice Flour Long Grain | 45 | 45 | 45 | 45 | 45 | 45 | 45 | 45 | 45 |
| Unmod. Pot. St. | 35.2 | 33.2 | 31.2 | 29.2 | 27.2 | 25.2 | 14.6 | 13.6 | 12.6 |
| Tapioca Dextrin (Crisp Coat ® UC) | 2 | 4 | 6 | 8 | 10 | 12 | 8 | 10 | 12 |
| Crosslinked Potato Starch (245 ppm) | 0 | 0 | 0 | 0 | 0 | 0 | 14.6 | 13.6 | 12.6 |
| Crosslinked Potato Starch (980 ppm) | 10 | 10 | 10 | 10 | 10 | 10 | 10 | 10 | 10 |
| Crosslinked Potato Starch (250 ppm) | 1.1 | 1.1 | 1.1 | 1.1 | 1.1 | 1.1 | 1.1 | 1.1 | 1.1 |
| Methocel K4M | 0.3 | 0.3 | 0.3 | 0.3 | 0.3 | 0.3 | 0.3 | 0.3 | 0.3 |
| Salt | 5 | 5 | 5 | 5 | 5 | 5 | 5 | 5 | 5 |
| SAPP #28 | 0.8 | 0.8 | 0.8 | 0.8 | 0.8 | 0.8 | 0.8 | 0.8 | 0.8 |
| Soda | 0.6 | 0.6 | 0.6 | 0.6 | 0.6 | 0.6 | 0.6 | 0.6 | 0.6 |
| Total | 100 | 100 | 100 | 100 | 100 | 100 | 100 | 100 | 100 |
| EVALUATIONS | 7A | 7B | 7C | 7D | 7E | 7F | 7G | 7H | 7I |
| CRISPINESS | | | | | | | | | |
| 5 min. | 5.5 | 5.5 | 5.5 | 5.5 | 5.5 | 5.5 | 5 | 5 | 5.5 |
| 10 min. | 5 | 5 | 5.5 | 5.5 | 5.5 | 5.5 | 5 | 5 | 5.5 |
| 15 min. | 4.5 | 4.5 | 5 | 5 | 5 | 5.5 | 4.5 | 4.5 | 5.5 |
| 20 min. | 4 | 4 | 4 | 4.5 | 5 | 5.5 | 4.5 | 4.5 | 5.5 |
| ROUGHNESS | 4 | 4 | 4 | 4 | 4 | 4 | 4 | 4 | 4 |

TABLE 7-continued

| | | | | | | | | | |
|---|---|---|---|---|---|---|---|---|---|
| COLOR | 0 | 0 | 0 | 0 | 0 | 0 | 0 | 0 | 0 |
| OIL | 6.4 | 6.1 | 6.8 | 6.8 | 7.1 | 6.1 | 6.5 | 7.2 | 7.8 |

EXAMPLE 6

According to this example, the general method of Example 1 was repeated utilizing an unmodified potato starch in combination with long grain rice flour and varying amounts of tapioca dextrin and slightly crosslinked (200 ppm) potato starch. The results reported in Table 8 further show that unmodified potato starch in combination with levels of rice flour greater than 35% provide improved crispness results.

TABLE 8

| INGREDIENTS | 8A % | 8B % | 8C % | 8D % | 8E % | 8F % | 8G % | 8H % | 8I % |
|---|---|---|---|---|---|---|---|---|---|
| Rice Flour Long Grain | 45 | 45 | 45 | 45 | 45 | 45 | 52 | 53 | 60.6 |
| Unmod. Pot. St. | 35.2 | 33.2 | 31.2 | 29.2 | 27.2 | 25.2 | 7.6 | 5.6 | 0 |
| Tapioca Dextrin (Crisp Coat ® UC) | 2 | 4 | 6 | 8 | 10 | 12 | 8 | 10 | 9 |
| Crosslinked Potato Starch (200 ppm) | 0 | 0 | 0 | 0 | 0 | 0 | 14.6 | 13.6 | 12.6 |
| Crosslinked Potato Starch (980 ppm) | 10 | 10 | 10 | 10 | 10 | 10 | 10 | 10 | 10 |
| Crosslinked Potato Starch (250 ppm) | 1.1 | 1.1 | 1.1 | 1.1 | 1.1 | 1.1 | 1.1 | 1.1 | 1.1 |
| Methocel K4M | 0.3 | 0.3 | 0.3 | 0.3 | 0.3 | 0.3 | 0.3 | 0.3 | 0.3 |
| Salt | 5 | 5 | 5 | 5 | 5 | 5 | 5 | 5 | 5 |
| SAPP #28 | 0.8 | 0.8 | 0.8 | 0.8 | 0.8 | 0.8 | 0.8 | 0.8 | 0.8 |
| Soda | 0.6 | 0.6 | 0.6 | 0.6 | 0.6 | 0.6 | 0.6 | 0.6 | 0.6 |
| Total | 100 | 100 | 100 | 100 | 100 | 100 | 100 | 100 | 100 |
| EVALUATIONS | 8A | 8B | 8C | 8D | 8E | 8F | 8G | 8H | 8I |
| CRISPNESS | | | | | | | | | |
| 5 min. | 5.8 | 5 | 5.8 | 5 | 5.8 | 5.5 | 5.5 | 6 | 6 |
| 10 min. | 5.5 | 5 | 5.5 | 5 | 5.8 | 5.5 | 5.5 | 6 | 6 |
| 15 min. | 5 | 4.5 | 5.5 | 4.5 | 5.8 | 5 | 5.5 | 6 | 6 |
| 20 min. | 4 | 4 | 5.5 | 4.5 | 5.8 | 4 | 5 | 5.5 | 5.5 |
| ROUGHNESS | 4 | 4 | 4 | 4 | 3 | 3 | 3 | 3 | 3 |
| COLOR | 1 | 1 | 1 | 0.5 | 1.5 | 1.5 | 1.5 | 2 | 2 |
| OIL | 7.97 | 7.38 | 7.79 | 8.06 | 8.69 | 8.92 | 6.02 | 6.1 | 6.06 |
| XL Level | 0 | 0 | 0 | 0 | 0 | 0 | 200 | 200 | 200 |

EXAMPLE 7

According to this example, the general method of Example 1 was repeated utilizing very high levels of long grain, short/medium grain or waxy rice flour in combination with a slightly crosslinked (200 ppm) potato starch. The results reported in Table 9 below show that excellent crispness scores were obtained with the slightly crosslinked potato starch and small amounts of dextrin. In addition, the results showing excellent crispness results for the waxy rice flour are unexpected since waxy rice flour is not known for its ability to function in batter coatings to enhance crispness characteristics. Also unexpected were the low oil uptake levels resembling those in the long grain rice.

TABLE 9

| INGREDIENTS | 9A % | 9B % | 9C % | 9D % |
|---|---|---|---|---|
| Rice Flour | 70 | 70 | 70 | 80 |
| Tapioca Dextrin (Crisp Coat ® UC) | 9 | 6 | 3 | 3 |
| Crosslinked Potato Starch (200 ppm) | 13.2 | 16.2 | 19.2 | 9.2 |
| PenPlus 40 | 1.1 | 1.1 | 1.1 | 1.1 |
| Methocel K4M | 0.3 | 0.3 | 0.3 | 0.3 |
| Salt | 5 | 5 | 5 | 5 |
| SAPP #28 | 0.8 | 0.8 | 0.8 | 0.8 |
| Soda | 0.6 | .6 | 0.6 | 0.6 |
| Total | 100 | 100 | 100 | 100 |
| EVALUATION | 9A | 9B | 9C | 9D |
| Long Grain Rice Flour CRISPNESS | | | | |
| 5 min. | 6 | 6 | 5.3 | 6 |
| 10 min. | 6 | 6 | 5 | 6 |
| 15 min. | 5 | 5 | 4 | 5.5 |
| 20 min. | 4.5 | 4.5 | 3.5 | 5 |
| ROUGHNESS | 3 | 3 | 3 | 4 |

TABLE 9-continued

|  | | | | |
|---|---|---|---|---|
| COLOR | 1.5 | 1.5 | 1.5 | 1.5 |
| OIL | 7.3 | 7.4 | 7.7 | 8 |
| *Short/Medium Grain Rice Flour* CRISPNESS | | | | |
| 5 min. | 5.5 | 5.5 | 5.5 | 5.5 |
| 10 min. | 5.5 | 5.5 | 5.5 | 5.5 |
| 15 min. | 5.5 | 5.2 | 5.2 | 5.5 |
| 20 min. | 5 | 5.2 | 5.2 | 5.5 |
| ROUGHNESS | 2.5 | 2.5 | 2.5 | 2.5 |
| COLOR | 1 | 1 | 1 | 1 |
| OIL | 7.9 | 7.5 | 7 | 6.9 |
| *Waxy Rice Flour* CRISPNESS | | | | |
| 5 min. | 6+ | 6+ | 6+ | 6+ |
| 10 min. | 6+ | 6+ | 6 | 6+ |
| 15 min. | 5.5 | 5.5 | 5.2 | 5.5 |
| 20 min. | 5 | 5 | 0 | 5.5 |
| ROUGHNESS | 2.5 | 2.5 | 2.5 | 2.5 |
| COLOR | 1 | 1 | 1 | 1 |
| OIL | 7 | 8.3 | 8.7 | 8.8 |

EXAMPLE 8

According to this example, the general method of Example 7 was repeated utilizing very high levels of long grain, short/medium grain or waxy rice flour in combination with a highly crosslinked (980 ppm) potato starch. The results reported in Table 10 below when compared to those in Table 9 show that when highly crosslinked potato starch is used in the presence of elevated levels of rice flour crispness decreases and oil uptake increases compared with use of the slightly crosslinked (200 ppm) potato starch.

TABLE 10

| INGREDIENTS | 10A % | 10B % | 10C % | 10D % | 10E % | 10F % | 10G % | 10H % |
|---|---|---|---|---|---|---|---|---|
| Long Grain Rice Flour | 70 | 70 | 70 | 80 | 70 | 70 | 70 | 80 |
| Short/Medium Grain Rice Flour | | | | | | | | |
| Waxy Rice Flour | | | | | | | | |
| Tapioca Dextrin (Crisp Coat ® UC) | 9 | 6 | 3 | 3 | 9 | 6 | 3 | 3 |
| Crosslinked Potato Starch (850 ppm) | 13.2 | 16.2 | 19.2 | 9.2 | | | | |
| Crosslinked Tapioca Starch (100 ppm) | | | | | 13.2 | 16.2 | 19.2 | 9.2 |
| Crosslinked Potato Starch (250 ppm) | 1.1 | 1.1 | 1.1 | 1.1 | 1.1 | 1.1 | 1.1 | 1.1 |
| Methocel K4M | 0.3 | 0.3 | 0.3 | 0.3 | 0.3 | 0.3 | 0.3 | 0.3 |
| Salt | 5 | 5 | 5 | 5 | 5 | 5 | 5 | 5 |
| SAPP #28 | 0.8 | 0.8 | 0.8 | 0.8 | 0.8 | 0.8 | 0.8 | 0.8 |
| Soda | 0.6 | 0.6 | 0.6 | 0.6 | 0.6 | 0.6 | 0.6 | 0.6 |
| Total | 100 | 100 | 100 | 100 | 100 | 100 | 100 | 100 |
| EVALUATION | 10A | 10B | 10C | 10D | 10E | 10F | 10G | 10H |
| CRISPNESS | | | | | | | | |
| 5 min. | 6 | 6 | 6 | 6 | 6 | 6 | 6 | 6 |
| 10 min. | 5.5 | 5.5 | 5 | 5 | 5 | 6 | 6 | 5.5 |
| 15 min. | 5 | 5 | 5 | 4 | 4.5 | 5 | 5 | 5.5 |
| 20 min. | 4 | 4 | 4 | 4 | 4.5 | 5 | 4.5 | 4.5 |
| ROUGHNESS | 3 | 3 | 3 | 3 | 3 | 3 | 3 | 3 |
| COLOR | 0.8 | 0.8 | 0.8 | 0.8 | 1.5 | 1.5 | 1.5 | 1.5 |
| OIL | 8.4 | 8.9 | 9.2 | 9 | 7.6 | 8.6 | 8.2 | 8.5 |
| INGREDIENTS | 10I % | 10J % | 10K % | 10L % | 10M % | 10N % | 10O % | 10P % |
| Long Grain Rice Flour | | | | | | | | |
| Short/Medium Grain Rice Flour | 70 | 70 | 70 | 80 | | | | |
| Waxy Rice Flour | | | | | 70 | 70 | 70 | 80 |
| Crisp Coat UC XC4-9000 | 9 | 6 | 3 | 3 | 9 | 6 | 3 | 3 |
| YB39-92 | 13.2 | 16.2 | 19.2 | 9.2 | 13.2 | 16.2 | 19.2 | 9.2 |
| PenPlus 40 | 1.1 | 1.1 | 1.1 | 1.1 | 1.1 | 1.1 | 1.1 | 1.1 |
| Methocel K4M | 0.3 | 0.3 | 0.3 | 0.3 | 0.3 | 0.3 | 0.3 | 0.3 |
| Salt | 5 | 5 | 5 | 5 | 5 | 5 | 5 | 5 |
| SAPP #28 | 0.8 | 0.8 | 0.8 | 0.8 | 0.8 | 0.8 | 0.8 | 0.8 |
| Soda | 0.6 | 0.6 | 0.6 | 0.6 | 0.6 | 0.6 | 0.6 | 0.6 |
| Total | 100 | 100 | 100 | 100 | 100 | 100 | 100 | 100 |
| EVALUATION | 10I | 10J | 10K | 10L | 10M | 10N | 10O | 10P |
| CRISPNESS | | | | | | | | |
| 5 min. | 6+ | 6+ | 6+ | 5.5 | 6+ | 6+ | 6+ | 6 |
| 10 min. | 6 | 6 | 6 | 5 | 5.5 | 5 | 5 | 5 |
| 15 min. | 5 | 5 | 5 | 4.5 | 5.5 | 4 | 4 | 5 |
| 20 min. | 5 | 5 | 4 | 4 | 5 | 4 | 4 | 4 |
| ROUGHNESS | 2.5 | 2.5 | 2.5 | 2.5 | 3 | 3 | 2.5 | 2.5 |
| COLOR | 1 | 1 | 1 | 1 | 1 | 1 | 1.5 | 1.5 |
| OIL | 6.2 | 6.8 | 6.5 | 6.8 | 8.4 | 8.6 | 9 | 8.7 |

Note: "6+" equals a firm, noisy bite with a tender interior; crispy and breaks cleanly after 30 minutes.

EXAMPLE 9

According to this example, the general method of Example 1 was carried out wherein very high levels of various rice flours were combined with crosslinked tapioca starch (200 ppm) and a tapioca dextrin containing crisping agent (Crisp Coat® UC). The results reported in Table 11 below show excellent crispness results obtained by use of elevated levels of rice flour in combination with the tapioca starch.

TABLE 11

| INGREDIENTS | 11A % | 11B % | 11C % | 11D % |
|---|---|---|---|---|
| Rice Flour | 70 | 70 | 70 | 80 |
| Tapioca Dextrin (Crisp Coat ® UC) | 9 | 6 | 3 | 3 |
| Crosslinked Tapioca Starch (200 ppm) | 13.2 | 16.2 | 19.2 | 9.2 |
| Crosslinked Potato Starch (250 ppm) | 1.1 | 1.1 | 1.1 | 1.1 |
| Methocel K4M | 0.3 | 0.3 | 0.3 | 0.3 |
| Salt | 5 | 5 | 5 | 5 |
| SAPP #28 | 0.8 | 0.8 | 0.8 | 0.8 |
| Soda | 0.6 | 0.6 | 0.6 | 0.6 |
| Total | 100 | 100 | 10 | 100 |

TABLE 11-continued

| EVALUATION | 11A | 11B | 11C | 11D |
|---|---|---|---|---|
| Long Grain Rice Flour CRISPNESS | | | | |
| 5 min. | 6+ | 6+ | 6+ | 6+ |
| 10 min. | 6+ | 6+ | 6+ | 6+ |
| 15 min. | 5.5 | 5.5 | 5.5 | 5.5 |
| 20 min. | 5 | 5 | 5.5 | 5 |
| ROUGHNESS | 3 | 3 | 3 | 3 |
| COLOR | 1.5 | 1.5 | 1.5 | 1.5 |
| OIL | 8.3 | 9 | 9 | 8.4 |
| Short/Medium Grain Rice Flour CRISPNESS | | | | |
| 5 min. | 6+ | 6+ | 6+ | 6 |
| 10 min. | 6+ | 6+ | 6 | 6 |
| 15 min. | 6+ | 6+ | 5 | 5 |
| 20 min. | 5.5 | 5.5 | 5 | 4 |
| ROUGHNESS | 2.5 | 2.5 | 2.5 | 2.5 |
| COLOR | 1.5 | 1.5 | 1 | 1 |
| OIL | 7.5 | 7.7 | 7.8 | 8 |
| Waxy Rice Flour CRISPNESS | | | | |
| 5 min. | 6+ | 6+ | lost | 6+ |
| 10 min. | 6+ | 6+ | lost | 6 |
| 15 min. | 6+ | 5.5 | lost | 6 |
| 20 min. | 6+ | 5 | lost | 6 |
| ROUGHNESS | 3 | 3 | lost | 2 |
| COLOR | 1.5 | 1.5 | lost | 1.5 |
| OIL | 9.1 | 8.6 | lost | 8.6 |

EXAMPLE 10

According to this example, the general method of Example 1 was carried out utilizing a lightly crosslinked potato starch (200 ppm) in combination with long grain rice flour treated with varying degrees of 5 oxidation (from 0.2% to 0.8% chlorine, based on weight of chlorine, such as in sodium hypochlorite, to weight of dry starch with the chlorination reaction run substantially to completion) as measured by a negative orthotolidine end point. The results reported in Table 12 show that oxidation of rice flour with increasing levels of chlorine provides improvements in crispness properties. There was no detectable chlorine odor in the batter or finished fries when the rice flour was treated with 0.2% or 0.4% chlorine. At 0.6% chlorine there was detectable chlorine odor in the batter (but not in the finished fries) while at 0.8% there was a strong chlorine odor in both the batter and finished fries.

TABLE 12

| INGREDIENTS | 12A % | 12B % | 12C % | 12D % |
|---|---|---|---|---|
| Long Grain Rice Flour __% Chlorine Oxidized | 70 | 70 | 70 | 70 |
| 20% Dextrin (Lykaby) | 9 | 6 | 3 | 0 |
| Crosslinked Potato Starch (200 ppm) | 13.2 | 16.2 | 19.2 | 22.2 |
| Crosslinked Potato Starch (250 ppm) | 1.1 | 1.1 | 1.1 | 1.1 |
| Methocel K4M | 0.3 | 0.3 | 0.3 | 0.3 |
| Salt | 5 | 5 | 5 | 5 |
| SAPP #28 | 0.8 | 0.8 | 0.8 | 0.8 |
| Soda | 0.6 | 0.6 | 0.6 | 0.6 |
| Total | 100 | 100 | 100 | 100 |

TABLE 12-continued

| EVALUATION | 12A | 12B | 12C | 12D |
|---|---|---|---|---|
| 0.2% Chlorine CRISPNESS | | | | |
| 5 min. | 6+ | 6+ | 6+ | 6+ |
| 10 min. | 5.5 | 5.5 | 5.5 | 5.5 |
| 15 min. | 5.5 | 5.5 | 5.5 | 5 |
| 20 min. | 5.5 | 5.5 | 5.5 | 5 |
| ROUGHNESS | 2 | 3.5 | 3.5 | 3.5 |
| COLOR | 2 | 2 | 2 | 2 |
| OIL | 9 | 8.4 | 8.3 | 7.1 |
| 0.4% Chlorine CRISPNESS | | | | |
| 5 min. | 6+ | 6+ | 6+ | 6+ |
| 10 min. | 6+ | 6+ | 6+ | 6+ |
| 15 min. | 6+ | 6+ | 5 | 5 |
| 20 min. | 6+ | 6 | 4 | 4 |
| ROUGHNESS | 2 | 2 | 2 | 2 |
| COLOR | 2 | 2 | 2 | 2 |
| OIL | 8.5 | 8.5 | 8.3 | 8.5 |
| 0.6% Chlorine CRISPNESS | | | | |
| 5 min. | 6+ | 6+ | 6+ | 5.5 |
| 10 min. | 6+ | 6+ | 6+ | 5 |
| 15 min. | 5 | 5 | 4 | 4 |
| 20 min. | 4 | 4 | 2 | 2 |
| ROUGHNESS | 2 | 2 | 2 | 2 |
| COLOR | 1.5 | 1.5 | 1.5 | 1.5 |
| OIL | 7.7 | 7.4 | 7.3 | 7.3 |
| 0.8% Chlorine CRISPNESS | | | | |
| 5 min. | 6+ | 6+ | 6+ | na |
| 10 min. | 5.5 | 5.5 | 5 | na |
| 15 min. | 4.5 | 4 | 4 | na |
| 20 min. | 3 | 2 | 2 | na |
| ROUGHNESS | 2 | 2 | 2 | na |
| COLOR | 2 | 2 | 2 | na |
| OIL | 7.7 | 7.4 | 6.5 | na |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A process for preparing a frozen potato product with a film-like coating on the outer surface which comprises:

cutting the raw potatoes;

blanching the potatoes;

partially drying the potatoes;

coating the potatoes with an aqueous slurry, the slurry having an as is solids content comprising ungelatinized starch and not less than 50% by weight rice flour.

2. The process of claim 1 wherein the starch enrobing slurry has an as is solids content comprising not less than 60% by weight rice flour.

3. The process of claim 1 wherein the starch enrobing slurry has an as is solids content comprising not less than 75% by weight rice flour.

4. The process of claim 1 wherein the ungelatinized starch is selected from the group consisting of potato, corn and tapioca starches.

5. The process of claim 1 wherein the ungelatinized starch is tapioca starch.

6. A coated potato product which is the product of the process of claim 1.

7. A process for preparing a frozen potato product with a film-like coating on the outer surface which comprises:

cutting the raw potatoes;

blanching the potatoes;

partially drying the potatoes;

coating the potatoes with an aqueous slurry, the slurry having an as is solids content comprising ungelatinized, modified or unmodified potato starch having a crosslinking level of less than 400 ppm starch and not less than 35% by weight rice flour.

8. The process of claim 7 wherein the ungelatinized potato starch is unmodified.

9. A coated potato product which is the product of the process of claim 7.

* * * * *